US010457181B2

(12) United States Patent
Stevens et al.

(10) Patent No.: US 10,457,181 B2
(45) Date of Patent: Oct. 29, 2019

(54) METHOD AND APPARATUS FOR SEAT AND BOLSTER ADJUSTMENT

(71) Applicant: NIO USA, Inc., San Jose, CA (US)

(72) Inventors: Colin Stevens, San Jose, CA (US); Christopher F. Eckert, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/427,743

(22) Filed: Feb. 8, 2017

(65) Prior Publication Data

US 2018/0141477 A1 May 24, 2018

Related U.S. Application Data

(60) Provisional application No. 62/425,968, filed on Nov. 23, 2016.

(51) Int. Cl.
*B60N 2/02* (2006.01)
*B60N 2/90* (2018.01)

(52) U.S. Cl.
CPC ............ *B60N 2/99* (2018.02); *B60N 2/0232* (2013.01); *B60N 2002/022* (2013.01); *B60N 2002/0212* (2013.01); *B60N 2002/0256* (2013.01)

(58) Field of Classification Search
CPC .............. B60N 2/99; B60N 2/0232; B60N 2002/0256; B60N 2002/0268
See application file for complete search history.

(56) References Cited

U.S. PATENT DOCUMENTS

| | | | | |
|---|---|---|---|---|
| 6,924,742 | B2* | 8/2005 | Mesina | B60N 2/002 340/457.1 |
| 8,126,615 | B2* | 2/2012 | McMillen | B60N 2/0232 701/49 |
| 8,687,334 | B2* | 4/2014 | Ueta | H02H 3/08 318/139 |
| 9,669,737 | B2* | 6/2017 | Lee | B60N 2/0232 |
| 2012/0041648 | A1* | 2/2012 | Yamaguchi | B60N 2/002 701/49 |
| 2016/0297337 | A1* | 10/2016 | White | B60N 2/2209 |
| 2017/0203675 | A1* | 7/2017 | Lem | B60N 2/914 |

\* cited by examiner

*Primary Examiner* — Philip F Gabler
(74) *Attorney, Agent, or Firm* — Sheridan Ross P.C.

(57) ABSTRACT

A method and apparatus of facilitating ingress or egress of a seat having bolsters includes detecting a potential ingress or egress of an occupant to the seat. Upon detection a configuration of the seat is altered from a first position to a second position, wherein a substantially flat surface is formed by a top of a seat portion of the seat and an associated bolster attached to the seat portion.

14 Claims, 9 Drawing Sheets

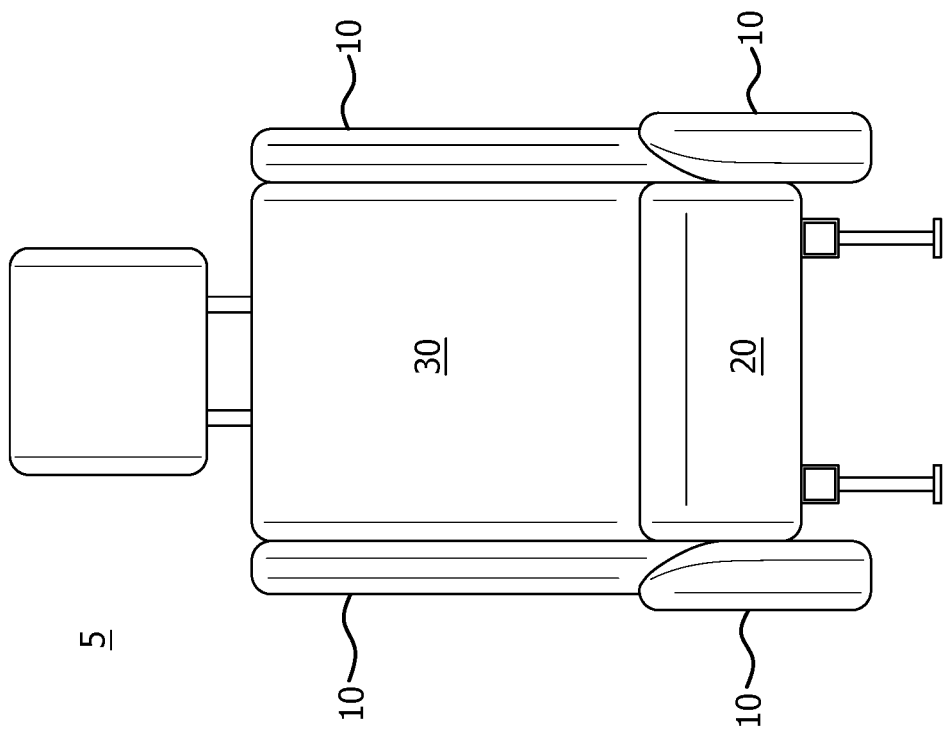
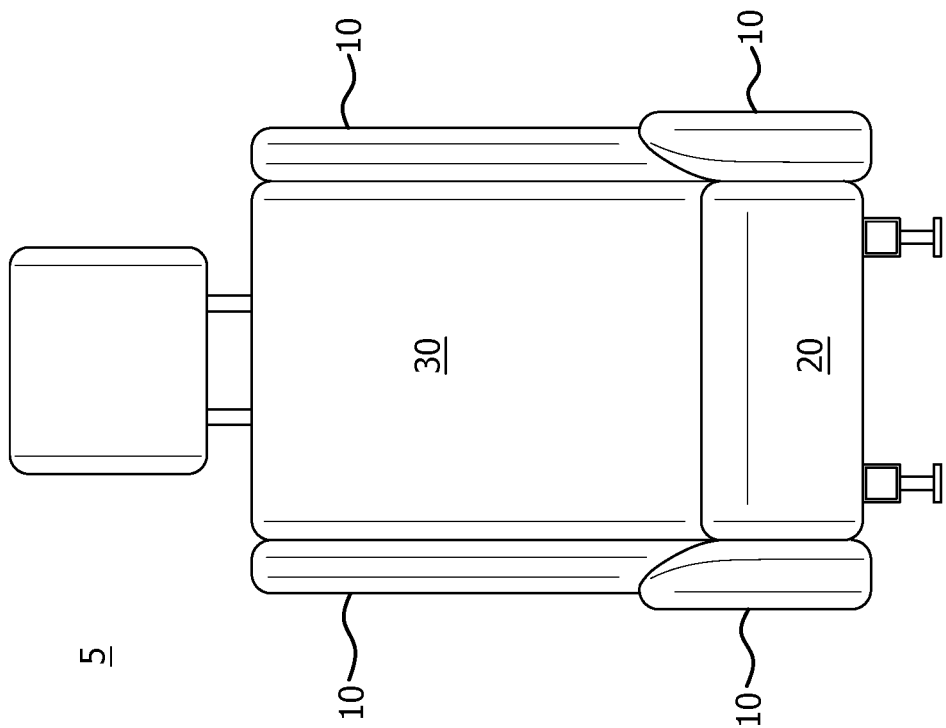

METHOD AND APPARATUS FOR SEAT AND BOLSTER ADJUSTMENT

CROSS REFERENCE TO RELATED APPLICATIONS

This application claims the benefit of U.S. Provisional Application Ser. No. 62/425,968, filed on Nov. 23, 2016, the contents of which are incorporated by reference herein as if fully set forth.

FIELD OF INVENTION

The present invention relates to ingress and egress of a vehicle seat, and more particularly to a method and apparatus for seat and bolster adjustment.

BACKGROUND

Seats in a vehicle often have a cushion portion and a back portion. Some vehicle seats include bolsters on either side of the seat cushion and the back portion to provide support on the sides of the person in the seat. Those bolsters can make it difficult for a person trying to get into and out of the vehicle. It would therefore be beneficial to have a way of providing easier access to the seat of a vehicle for a person desiring to get out of the vehicle or enter it.

SUMMARY

A method of facilitating ingress or egress of a seat having bolsters is disclosed. The method includes detecting a potential ingress or egress of an occupant to the seat. Upon detection a configuration of the seat is altered from a first position to a second position, wherein a substantially flat surface is formed by a top of a seat portion of the seat and an associated bolster attached to the seat portion.

BRIEF DESCRIPTION OF THE DRAWINGS

A more detailed understanding can be had from the following description, given by way of example in conjunction with the accompanying drawings wherein:

FIGS. 3A-3B are front elevation views of the example seat of FIG. 1 showing an active seat portion system;

DETAILED DESCRIPTION

Figure 1:
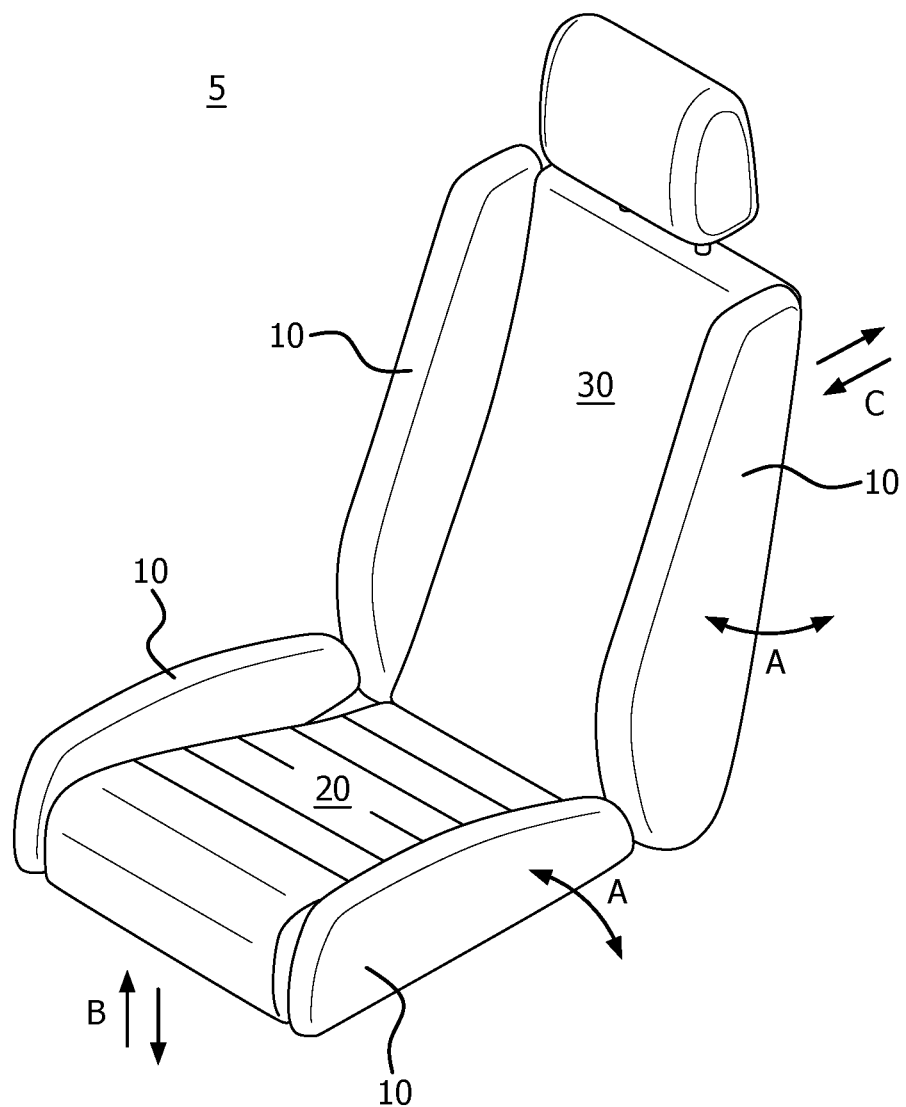
FIG. 1 is a perspective view of an example vehicle seat.

Although a method and apparatus for seat and bolster adjustment will be described in more detail below, briefly a method and apparatus are described herein to facilitate a person, such as a driver or a passenger entering or exiting a vehicle seat. This is performed by adjusting the bolsters of the vehicle seat on the side of the access door to allow a person to avoid having to lift his or her body over the bolsters while entering or exiting the vehicle. In addition, or alternatively, this is performed by raising a seat portion of a vehicle seat and/or moving a back portion of the vehicle seat forward. The Figures are now described below wherein like reference numerals refer to similar components across the several views.

Accordingly, FIG. 1 is a perspective view of an example vehicle seat 5. The example vehicle seat 5 includes a plurality of seat bolsters 10, which are generally disposed on either side of a seat portion 20 and a back portion 30. The bolsters 10 that are on an ingress/egress side of a vehicle, (i.e., on the door side such as the left side in a left-drive vehicle or the right side in a right-drive vehicle), are adapted to pivot along the curve A. Additionally, or alternatively, the seat portion 20 is adapted to be raised or lowered in the arrows shown in the direction of B, while the back portion 30 is adapted to be moved forward or backward in the direction of the arrows shown along C. In addition, the seat portion could be adapted to pivot in other directions, (e.g., forward and backward), to facilitate ingress and egress of the vehicle.

Figure 2B:
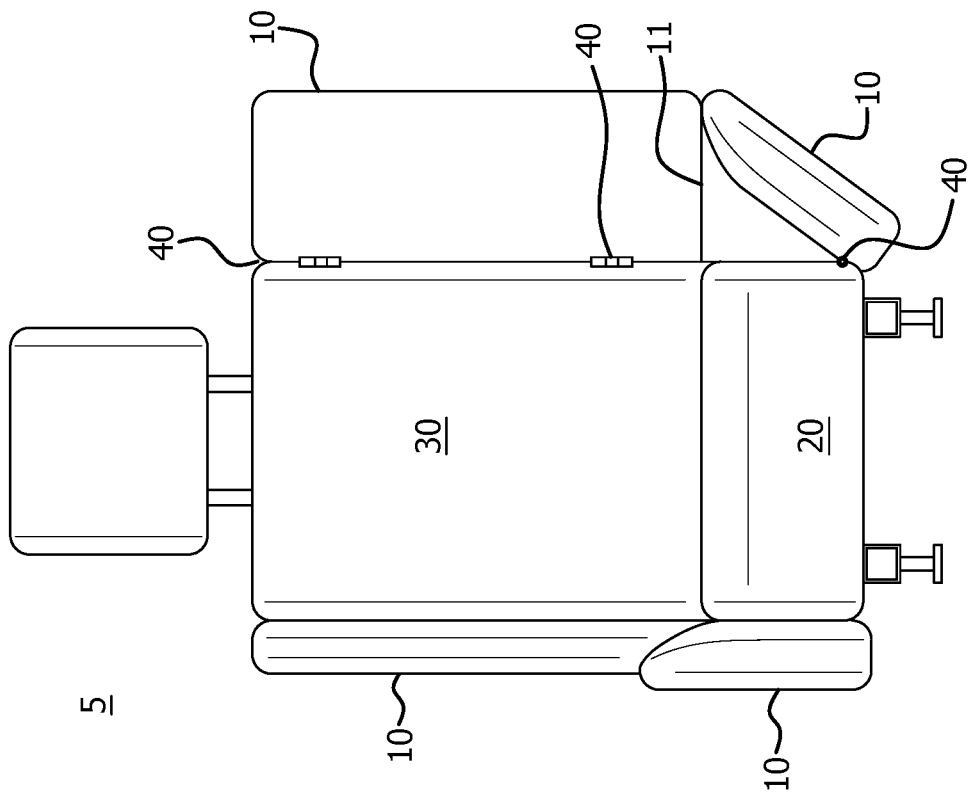
FIGS. 2A-2B are front elevation views of the example vehicle seat of FIG. 1 showing an active bolster system.
Figure 2A:
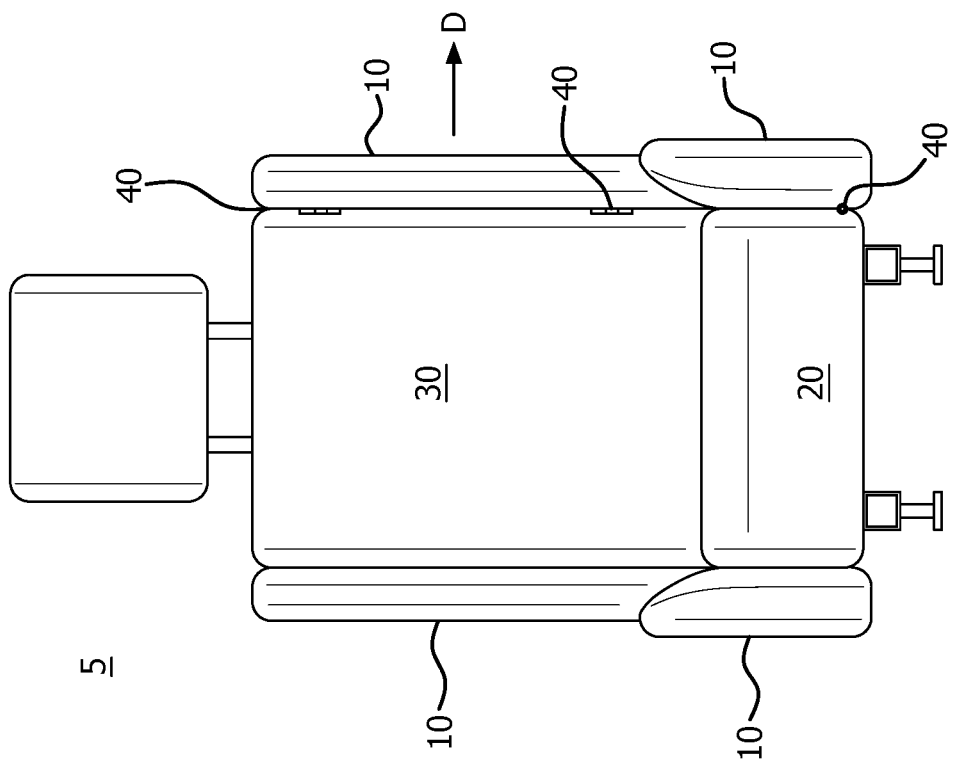

FIG. 2A is a front elevation view of the example vehicle seat 5 of FIG. 1 showing an active bolster system in a first position. As depicted in FIG. 2A, the bolsters 10 on one side includes hinges 40, to allow the bolsters 10 to pivot from the first position to a second position. That is, the arrow in the direction of D indicates the direction of a door for access to the vehicle seat 5. Accordingly, the bolsters 10 on the side D include hinges 40 to allow the bolsters 10 to pivot from the first position to the second position, (e.g., along the curve A depicted in FIG. 1). The shafts of hinges 40 are operatively connected to a motor (not shown), that when activated cause the hinges to open or close in order to force the bolsters 10 on side D from the first position to the second position and back. Alternatively, the bolsters 10 could alter from the first position to the second position by being inflatable. That is, when inflated, the bolsters 10 are in the first position, and when deflated, the bolsters are in the second position. A mechanism can be operatively connected to the bolsters 10 to inflate and deflate them.

FIG. 2B is a front elevation view of the example vehicle seat 5 of FIG. 1 showing the active bolster system in the second position. In this position, as depicted in FIG. 2B, the bolsters 10 on the door side (D) of the vehicle seat 5 are extended from the seat portion 20 and the back portion 30 such that a substantially flat surface 11 is formed that is substantially in the same horizontal plane as the top of seat portion 20. In addition, a substantially flat surface is formed in the same manner with the back portion 30. The substantially flat surface 11 may be formed by utilizing an extension that is connected to the top of the bolster 10 on one end and top of seat portion 20 on a second end. The vertical bolster 10 shown connected to back portion 30 may include a similar extension to form the substantially flat surface connecting the front of back portion 30 to the front of the vertical bolster 10.

Accordingly, FIGS. 2A and 2B depict a mechanism for which the bolsters, (e.g., bolsters 10), pivot about a hinge to proceed from the first position to the second position. In the first position, an occupant such as a driver or passenger can be seated comfortably with support in the seat. However, to make it easier for the driver or passenger to enter or exit the vehicle, the bolsters can be pivoted to the second position, where a substantially flat surface is formed in the same respective planes as the top of the seat portion and the front of the back portion. In this manner, the driver or passenger can more easily enter or exit the vehicle without having to maneuver his or her body over the bolsters. And the bolsters can be rotated back to the first position once the occupant is seated for comfort.

Alternatively, the seat portion 20 and/or the back portion 30 of the seat 5 in FIG. 1 can be manipulated to similarly provide such a flat surface to ease the ingress or egress into the vehicle. Accordingly, FIG. 3A is a front elevation view of the example seat 5 of FIG. 1 showing an active seat portion system in a first position. The seat 5 again includes a plurality of bolsters 10, a seat portion 20 and a back portion 30. As depicted in FIG. 3A, the seat portion 20 is disposed in a first position, which may be a normal position for an occupant who is sitting in the seat 5. In this position, the top of the seat portion 20 is beneath the top of the associated bolsters 10, which provide lateral support on either side of the occupant. When the active seat portion system is activated, a mechanism (described in more detail below) causes the top of the seat to rise in order to form a substantially flat surface along the plane of the top of the associated bolsters 10.

FIG. 3B is a front elevation view of the example seat 5 of FIG. 1 showing the active seat portion system in a second position. As can be seen in FIG. 2B, the top of seat portion 20 is moved to the second position, where it is in substantially the same plane as the top of the associated bolsters 10. In this manner, a substantially flat surface is formed by the top of the bolsters 10 and the top of the seat portion 20, thus facilitating ingress and egress into the seat 5.

In addition, the back portion 30 of the seat 5 can be moved forward to align it with the same plane as the front of the bolsters 10 that are associated with the back portion. FIG. 3C is a top plan view of the example seat 5 of FIG. 1 showing an active back portion system in a first position. That is, the back portion 30 in the first position is depicted as being behind the front of the associated bolsters 10. In the first position, therefore, an occupant can be comfortably seated in seat 5, receiving lateral support from the associated bolsters. Upon activation of the active back portion system, the front of the back portion 30 can be moved forward to a second position that aligns it with the front of the associated bolsters 10.

Figure 3D:
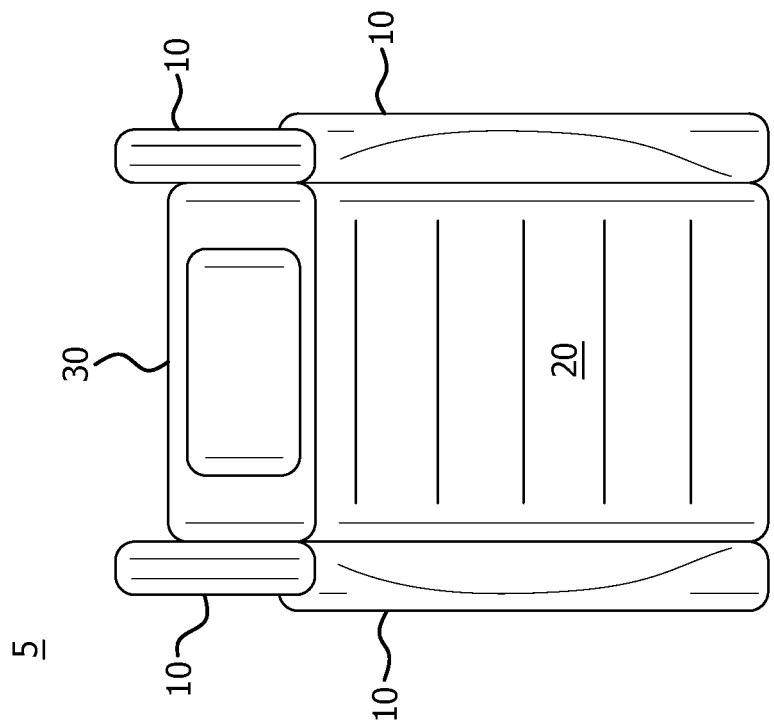
FIG. 3C-3D are top plan views of the example seat of FIG. 1 showing an active back portion system.
Figure 3C:
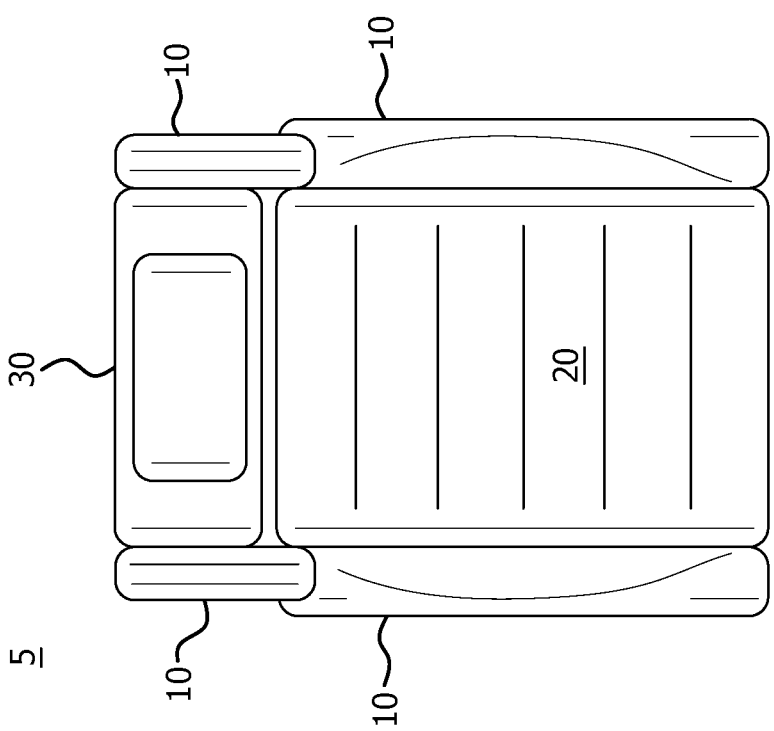

FIG. 3D is a top plan view of the example seat of FIG. 1 showing the active back portion system in the second position. As shown in FIG. 3D, in the second position, the front of back portion 30 is substantially in the same plane as the front of the associated bolsters 10. In this manner, a substantially flat surface is formed that facilitates the ingress or egress into seat 5. It should be noted that the active seat portion system and active back portion system can be utilized together or independent of one another.

Figure 4A:
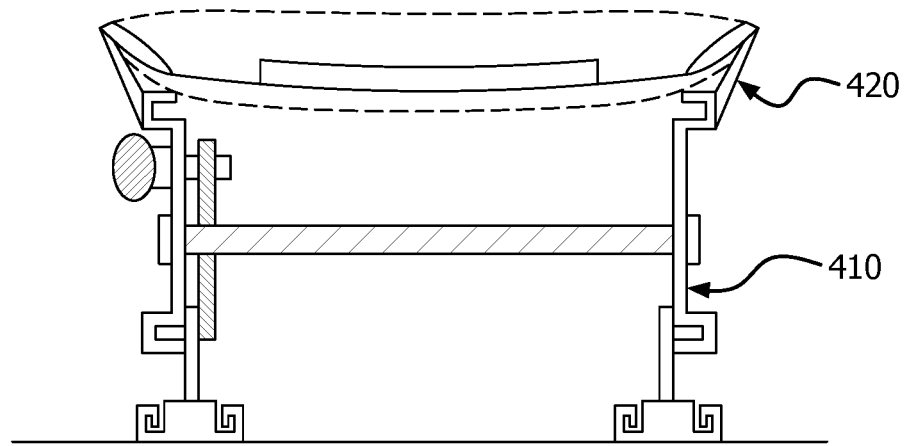
FIG. 4A is a front elevation of a partial seat portion of the example vehicle seat of FIG. 1.

FIG. 4A is a front elevation of a partial seat assembly 400 of the example vehicle seat 5 of FIG. 1. The partial seat assembly 400 includes a base 410, which in an example, is a conventional vehicle seat base that is mounted to the floor of the vehicle in a conventional manner. Accordingly, it is to be understood that components found in a conventional seat base are not further described herein. Mounted to the base 410 is an active seat system 420, which is further described below, but briefly here can be described as the system which causes the seat portion 20 to raise and lower. It should also be noted that the active seat system 420 described herein can be utilized as an active back system for moving the back portion 30 forward and backward by similar mechanism.

Figure 4B:
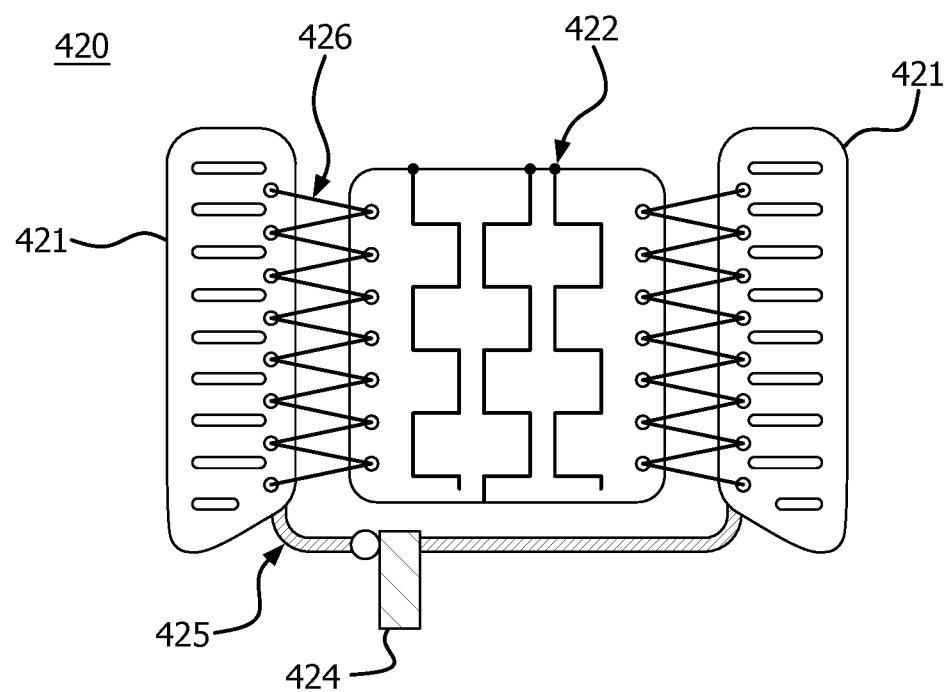
FIG. 4B is a top plan view of an example active seat system.

FIG. 4B is a top plan view of the example active seat system 420, the mechanism for which is described herein. The active seat system 420 includes a plurality of bolster inserts 421, which are disposed inside of the bolsters 10 to facilitate the bolsters proceeding from the first position to the second position (described in further detail below), a mat 422, which can be a conventional flex/spring mat found in a conventional seat, a motor 424, a shaft 425, (e.g., a bowden tube), and cables 426. As depicted in FIG. 4B, the bolster inserts 421 are attached to the mat 422 via the cables 426, which are interlaced throughout openings in both the bolster inserts 421 and the mat 422. In addition, one end of each of the cables 426 are attached to the shaft 425 at the end of each of the bolster inserts 421 that is proximal to the shaft 425. The other end of each cable 426 is secured to its associated bolster insert 421 at the end distal to the shaft 425. When the motor 424 operates, it drives the shaft 425 from a first position, where the cables 426 have a level of slack in them, to a second position where the cables 426 are pulled tight.

Figure 4C:
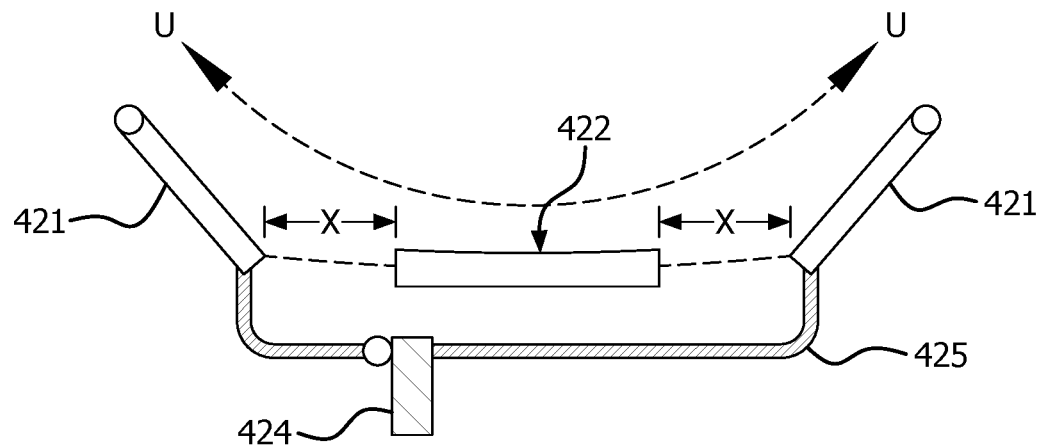
FIG. 4C is a front elevation of the example active seat system of FIG. 4B shown in a first position.

FIG. 4C is a front elevation of the example active seat system 420 of FIG. 4B shown in the first position. In FIG. 4C, the motor 424 causes the shaft 425 to expand along the width of the active seat system 420. Accordingly, as described above, the cables 426 connected to the ends of the shaft 425 at each bolster insert 421 are provided with slack X. In this first position, the bolster inserts 421 and mat 422 generally form a curve U, which may be a conventional position for the bolsters 10 and seat portion 20 to provide support for an occupant of the seat 5.

Figure 4D:
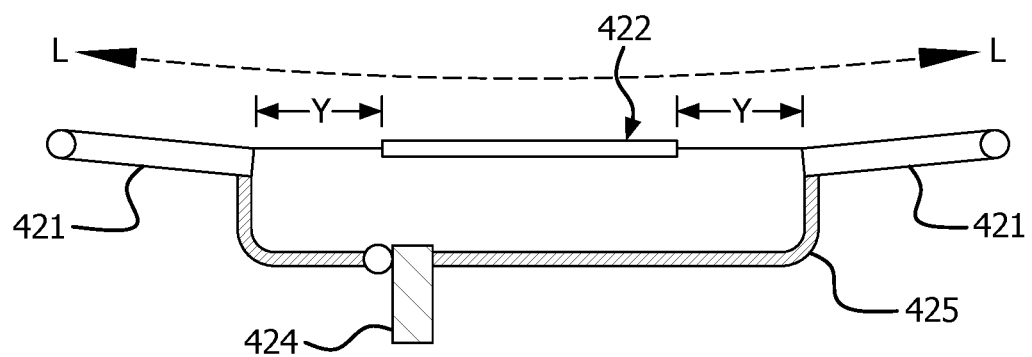
FIG. 4D is a front elevation of the example active seat system of FIG. 4B shown in a second position.

In order to facilitate ingress or egress of the vehicle, the active seat system 420 can be put in the second position. FIG. 4D is a front elevation of the example active seat system of FIG. 4B shown in the second position. In this position, the motor 424 can cause the shafts 425 to shorten in distance relative to the active seat system 420, which in turn puts tension on each set of cables 426, pulling them tight. As a result, the slack is reduced to a smaller amount Y, that in turn causes the bolster inserts 421 to be substantially in the same plane L as the mat 422. In this manner, the active seat system 420 provides a substantially flat surface along bolsters 10 and seat portion 20 to ease the ingress and egress of the vehicle into or out of seat 5.

It should be noted that, as mentioned above, the mechanisms for active seat system 420 could also be implemented in the back portion 30. That is, the first position described in FIG. 4C above could be understood to apply to the mechanism being placed in the back portion 30 where the curve U allows for an occupant to be seated against the back portion 30 in a comfortable supportive position. The second position described in FIG. 4D could be understood to apply to the mechanism having pulled tight a mat, (e.g., a mat substantially similar to mat 422) situated in back portion 30, and associated bolster inserts 421, both situated in associated vertical bolsters 10 to back portion 30. In such a way, the substantially planar surface L would be formed along back portion 30 and its associated bolsters 10.

It should be noted that the active seat/back systems described above are described with reference to a shaft, (i.e., shaft 425), being expanded or contracted to cause cables such as cables 426 to be pulled tight or loosened. However, other mechanisms can be utilized to achieve the same purpose. For example, the shaft could be rotationally connected to the motor, (i.e., motor 424), such that when the motor operates in a first direction, the shaft, (e.g., shaft 425), is rotated in a first direction that causes the end of the cables connected to it to be wound about the shaft pulling the cables tight, which causes the active seat/back system to move from the first to the second position. Conversely, when the motor operates in a second, opposite, direction, the shaft will rotate in a second, opposite, direction as well, causing its associated cables to unwind, thus loosening them and allowing the seat/back system to go from the second position to the first position.

Figure 5:
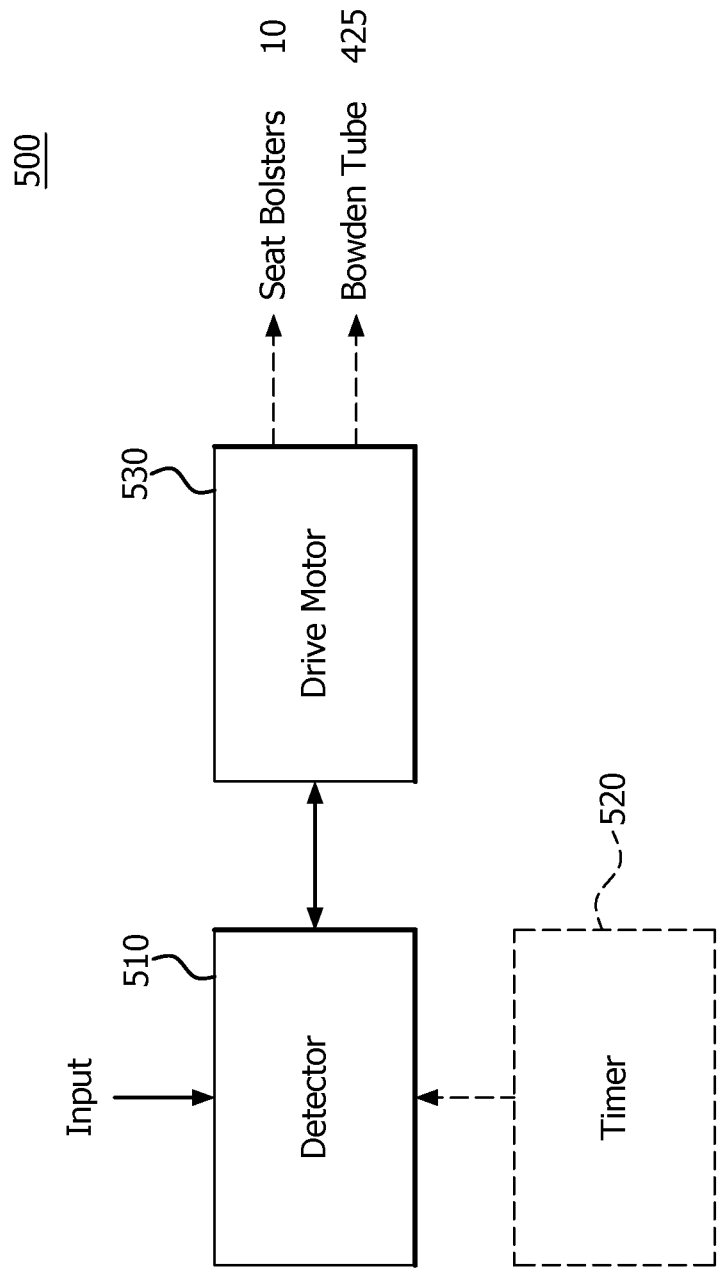
FIG. 5 is a functional block diagram of an example control system.

Although the mechanisms for facilitating ingress and egress are described above, a system for controlling the above described systems from the first position to the second position, and vice versa, as well as methods of ingress and egress are now described in more detail. FIG. 5 is a functional block diagram of an example control system 500. The control system 500 includes a detector 510, which is operatively connected to an optional timer 520, as well as being operatively coupled to a drive motor 530. The detector 510 receives inputs, and optionally a timing input from the optional timer 520, to determine whether to signal to the drive motor 530 to cause either the active bolster system or active seat/back system to move from a first position to the second position and vice versa, as well as to receive a signal from the drive motor 530 when an operation is complete.

The detector 510 can receive multiple inputs that indicate to it that it should signal the drive motor 530 to cause the active bolster or seat/back systems to move from one position to the other. For example, the detector 510 could receive signals from a radio transmitter such as that in a key fob for the vehicle, or a signal from the transmission system indicating that a vehicle having an automatic transmission has been placed in park, drive, reverse or the like. Alternatively, the detector 510 could receive a signal from a manual transmission that the vehicle has been placed in gear. In addition, the detector 510 could receive a signal from a parking brake indicating that the brake has been engaged or disengaged.

Once the detector 510 has determined that the active bolster or seat/back systems should proceed from one position to the other, it sends the signal to drive motor 530, which in turn is operatively connected to the seat bolsters 10, (e.g., via the hinges 40 or an associated shaft), or to the shaft 425, which in one example is a bowden tube. The drive motor 530 then operates to cause the particular system to proceed from one position to the other. In the example described in FIGS. 3A-4D above, the drive motor 530 can be the motor 424. As also mentioned above, the detector 510 can be optionally receive a signal from the timer 530, which generates a timed countdown and sends a timeout signal to the detector 510 to indicate to it to signal the detector 510 to cause the drive motor 530 to change the position of the active bolster or seat/back system, (e.g., from the second position back to the first position).

Figure 6:
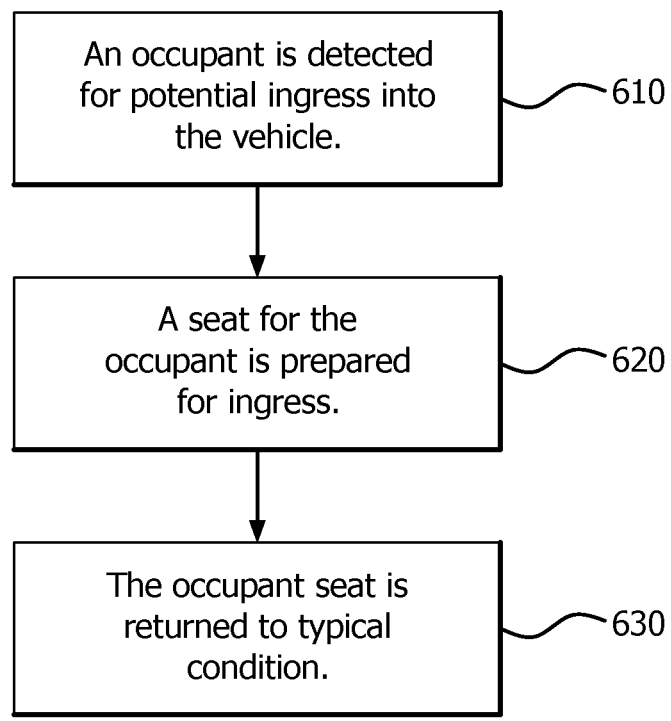
FIG. 6 is a flow diagram of an example method for providing ingress to a vehicle seat.

FIG. 6 is a flow diagram of an example method 600 for providing ingress to the vehicle seat 5. In step 610 an occupant is detected for potential ingress into the vehicle. For example, referring back to FIG. 5, the detector 510 detects a signal from the key fob associated with the vehicle that has come in close proximity to the vehicle, indicating to the detector 510 that someone is approaching the vehicle for potential ingress. Alternatively, the detector could receive a signal that one or more vehicle doors have been unlocked. Accordingly, the vehicle seat 5 for that occupant is prepared for the ingress (step 620). This may be achieved by any of the mechanisms and/or systems described above to cause them to proceed from the first position to the second position, (i.e., the detector 510 sends the appropriate signal to the drive motor 520).

Once the occupant is seated in the vehicle seat 5, the seat is returned to its typical position, (e.g., the first position), to provide comfort and support for the occupant (step 630). This may be achieved in a number of example ways. For example, once the seat is moved from the first position to the second position, the timer 520 may begin a countdown where after a predetermined amount of time has elapsed, it sends the timeout signal to the detector 510 to return the seat to the first position. Alternatively, step 630 could be triggered by another event, such as when the vehicle is placed into gear, such as $1^{st}$ gear or reverse for a manual transmission, or drive or reverse for an automatic transmission. At this point, the vehicle seat 5 is back in a position for the occupant to travel comfortably.

Figure 7:
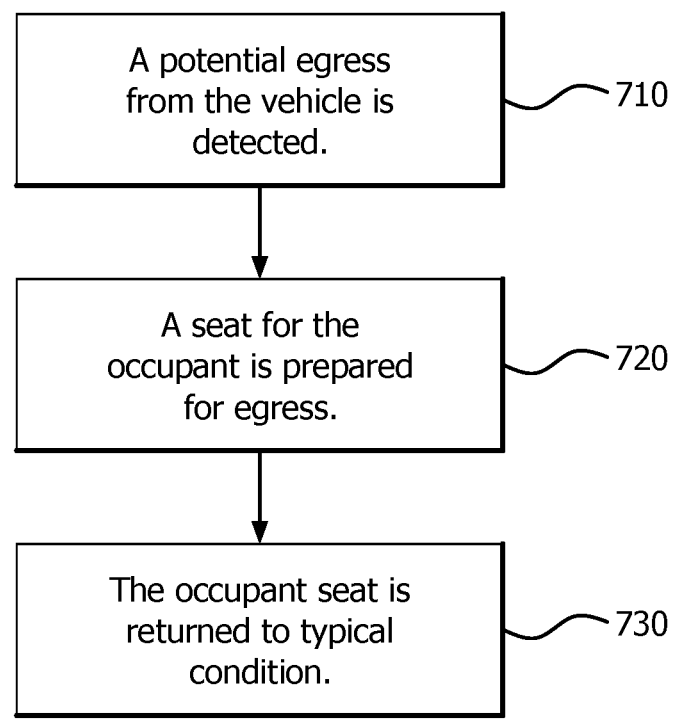
FIG. 7 is a flow diagram of an example method for providing egress from a vehicle seat.

FIG. 7 is a flow diagram of an example method 700 for providing egress from the vehicle seat 5. In step 710, it is detected that an occupant may potentially egress from the vehicle. For example, the detector 510 receives a signal that the vehicle has been placed in park or the parking brake has been engaged or the like, as described above. In this case, the seat for the occupant is prepared for egress (step 720). Similarly to method 600, this may be achieved by any of the mechanisms and/or systems described above to cause them to proceed from the first position to the second position, (i.e., the detector 510 sends the appropriate signal to the drive motor 520).

Once the occupant has exited the vehicle, the occupant seat is returned to its typical condition, (i.e., from the second position to the first position), in step 730. Again, this may be achieved in a number of example ways. For example, once the seat is moved from the first position to the second position, the timer 520 may begin a countdown where after a predetermined amount of time has elapsed, it sends the timeout signal to the detector 510 to return the seat to the first position. It should be noted that this may also be optional, and the seat may remain in the second position after the occupant has exited the vehicle.

It should be noted that the methods described above relate to moving the seat of a potential occupant, or actual occupant upon activation of the mechanism/systems described above. However, it is noted that any combination of seats could be affected by the ingress or egress methods, including all the seats in the vehicle that include bolsters. In this manner, upon detection of one potential occupant preparing to enter or exit the vehicle, all seats could be put in the second position to facilitate the ingress or egress of anyone desiring to enter or exit the vehicle.

Additionally, the control system described above could be implemented in any type of circuitry, including a processor, that would allow for the control of the motors that drive the mechanisms/systems described above from the first position to the second position, and vice versa.

What is claimed is:

1. An active vehicle bolster system, comprising:
   a seat;
   at least one bolster disposed on one side of the seat;
   a detector;
   a drive motor coupled to the at least one bolster and the detector, the drive motor operable, upon receiving a first signal from the detector, to cause the at least one bolster to alter position from a first position to a second position, the second position being a position in which a surface of the seat and a surface of the at least one bolster are in a substantially same first plane, the first position being a position in which the surface of the at least one bolster forms a non-zero angle with the first plane, wherein the seat includes a mat,
wherein the at least one bolster includes a first bolster having a first bolster insert at a first side of the seat, and a second bolster having a second bolster insert at a second side of the seat opposite the first side,
a first cable interlaced through first openings formed through the first bolster insert and first openings formed through the mat;
a second cable interlaced through second openings formed through the second bolster insert and second openings formed through the mat; and
a shaft coupled to the at least one bolster insert and driveable by the drive motor such that in the first position the first and second cables have a level of slack and such that in the second position the first and second cables are pulled tight,
wherein the first openings in the first bolster insert are aligned with one another at an edge of the first bolster insert that is closest to the mat,
wherein the first openings in the mat are aligned with one another at an edge of the mat that is closest to the first bolster insert,
wherein the second openings in the second bolster insert are aligned with one another at an edge of the second bolster insert that is closest to the mat, and
wherein the second openings in the mat are aligned with one another at an edge of the mat that is closest to the second bolster insert.

2. The system of claim 1, wherein the detector sends the first signal to the drive motor upon detecting a potential ingress to or egress from the vehicle.

3. The system of claim 2, wherein the detector receives a transmission from a key fob from the vehicle indicating a potential ingress.

4. The system of claim 2, wherein the detector receives a transmission from the vehicle indicating the vehicle has been placed in park or a parking brake of the vehicle has been set.

5. The system of claim 1, wherein the detector is coupled to a timer that sends a signal to the detector that a predefined amount of time has elapsed, and the detector sends a second signal to the drive motor to cause the at least one bolster to proceed from the second position to the first position.

6. The system of claim 1, wherein the at least one bolster is associated with a seat cushion of the seat.

7. The system of claim 1, wherein the at least one bolster is associated with a back portion of the seat.

8. A system comprising:
a seat;
at least one bolster disposed on one side of the seat;
a detector; and
a drive motor coupled to a first portion of the seat and the detector, the drive motor operable, upon receiving a first signal from the detector, to cause the first portion to alter position from a first position to a second position,
wherein the seat includes a mat,
wherein the at least one bolster includes a first bolster having a first bolster insert at a first side of the seat, and a second bolster having a second bolster insert at a second side of the seat opposite the first side,
a first cable interlaced through first openings formed through the first bolster insert and first openings formed through the mat;
a second cable interlaced through second openings formed through the second bolster insert and second openings formed through the mat; and
a shaft coupled to the at least one bolster insert and driveable by the drive motor such that in the first position the first and second cables have a level of slack and such that in the second position the first and second cables are pulled tight,
wherein the first openings in the first bolster insert are aligned with one another at an edge of the first bolster insert that is closest to the mat,
wherein the first openings in the mat are aligned with one another at an edge of the mat that is closest to the first bolster insert,
wherein the second openings in the second bolster insert are aligned with one another at an edge of the second bolster insert that is closest to the mat, and
wherein the second openings in the mat are aligned with one another at an edge of the mat that is closest to the second bolster insert.

9. The system of claim 8, wherein the first portion is seat cushion portion of the seat.

10. The system of claim 8, wherein the first portion is a back portion of the seat.

11. The system of claim 8, further comprising a timer in communication with the detector, wherein the timer sends a signal to the detector that a predefined amount of time has elapsed, and the detector sends a second signal to the drive motor to cause the first portion to proceed from the second position to the first position.

12. The system of claim 8, wherein the second position is a position in which a surface of the seat and a surface of the at least one bolster are in a substantially same first plane, and wherein the first position is a position in which the surface of the at least one bolster is in the first plane and the surface of the seat is in a second plane different from the first plane.

13. The system of claim 12, further comprising:
at least one shaft coupled to the drive motor and the first portion, the at least one shaft being driveable by the drive motor to cause the first portion to move between the first and second positions.

14. The system of claim 1, wherein the shaft is coupled to an end of the at least one bolster insert.

* * * * *